D. G. CARTER.
CONVERTIBLE BOLT.
APPLICATION FILED JUNE 9, 1919.

1,414,979.

Patented May 2, 1922.

Inventor:
Douglas G. Carter,
By Byrnes, Townsend & Brickenstein,
Attorneys.

UNITED STATES PATENT OFFICE.

DOUGLAS GRAND CARTER, OF PICTON, ONTARIO, CANADA.

CONVERTIBLE BOLT.

1,414,979.   Specification of Letters Patent.   Patented May 2, 1922.

Application filed June 9, 1919. Serial No. 302,805.

*To all whom it may concern:*

Be it known that I, DOUGLAS G. CARTER, a subject of the King of Great Britain, residing at Picton, in the Province of Ontario and Dominion of Canada, have invented certain new and useful Improvements in Convertible Bolts, of which the following is a specification.

The present invention relates to bolts and particularly to an attachment for converting bolts generally known as "carriage bolts" to bolts generally known as "machine bolts."

The common carriage bolt has a round head with an oval top and just under the head has a square shank portion which has the function to hold the bolt against turning when driven into wood.

The common machine bolt has a square, pentagonal, hexagonal or generally angular head of sufficient thickness to which a wrench is usually applied to hold it from turning on the work when the nut is screwed up on the opposite side.

Each of these two classes of bolts has its own particular field of application and is normally unfit for other uses.

Ordinarily hardware stores must carry a considerable stock of each class of bolts. If they should run out of machine bolts the largest supply of carriage bolts would not be of any use, should customers ask for machine bolts or vice versa.

It is the object of the invention to provide means whereby in a simple and inexpensive manner a carriage bolt can be converted into a machine bolt or, stated in a different way, to provide a special form of machine bolt which may be used as a carriage bolt.

The invention, briefly defined, consists in a separate article of manufacture attachable to a carriage bolt to convert it into a machine bolt.

In order that the invention may be better understood, reference is had to the accompanying drawings, in which—

Figure 1:
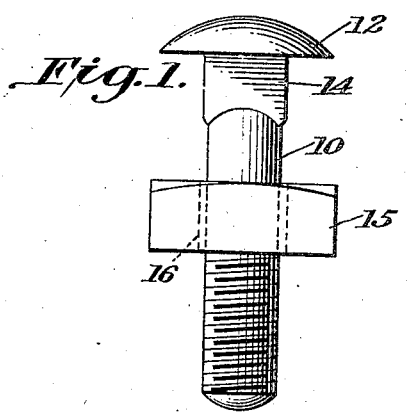
Figure 4:
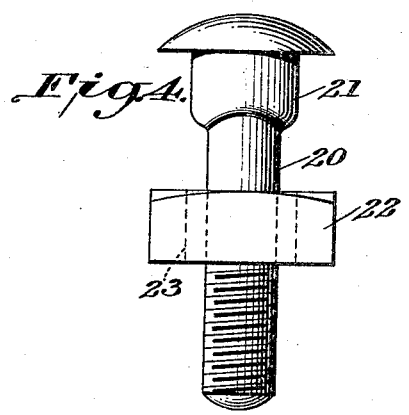
Figure 7:
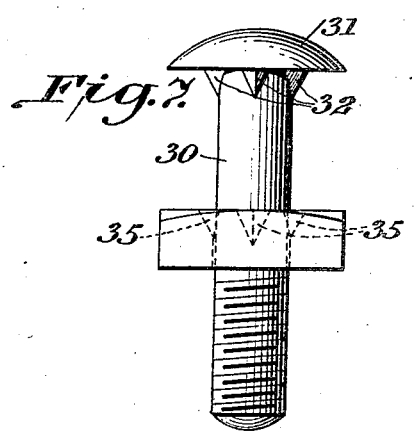

Figs. 1, 4 and 7 are elevational views of different forms of bolts to which the invention is applied.

Figure 2:
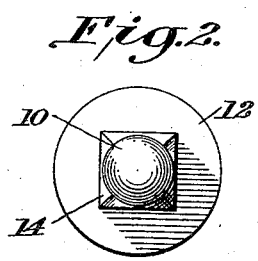
Figure 3:
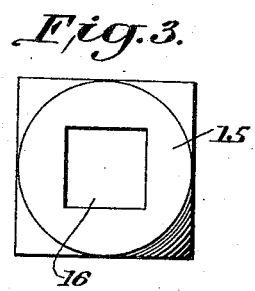
Figure 5:
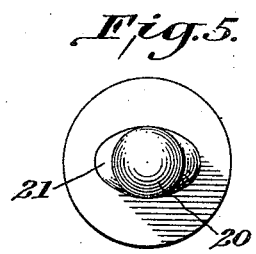
Figure 6:
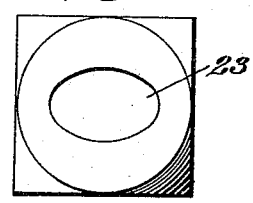
Figure 8:
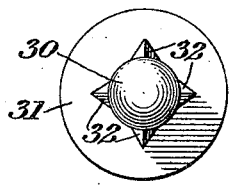
Figure 9:
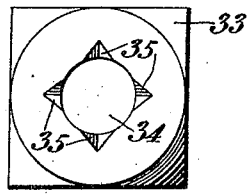

Figs. 2, 5 and 8 are end views of the bolts shown in Figs. 1, 4 and 7 respectively; and Figs. 3, 6 and 9 are plan views of the devices forming the subject matter of the invention as applied to the different kinds of bolts.

In Figs. 1, 2 and 3, 10 represents a common carriage bolt. Directly below the round head 12 is the usual squared shank portion 14. 15 represents the attachment constituting the invention. This attachment has a square perimeter and is of such size that the perimeter of the head 12 lies within it and does not interfere with the application of a wrench thereto. The attachment 15 has an aperture 16 of such size and shape as to loosely fit the squared portion 14. When the attachment is in position against the head 13, it forms together with the head the equivalent of the usual squared head of a machine bolt and the carriage bolt thus may be applied for all intents and purposes like a machine bolt.

Figs. 4, 5 and 6 show a bolt 20 having an oval shank portion 21. The attachment 22 has an oval aperture 23 to loosely fit this oval shank portion.

Figs. 7–9 show a bolt 30 provided under the head 31 with triangular projections 32 adapted to normally bite into the wood or other relatively soft material. The attachment 33 has an aperture 34 to fit over the bolt and additional triangular notches 35 to receive the projections 32.

In the foregoing I have illustrated several examples of bolts of the carriage bolt type. It is understood that the attachment is applicable to any other bolt of similar character. It is merely necessary to so form the attachment that it passes over the means ordinarily provided on the bolt for locking it to the substructure and thus constitutes in essence a wrench-engaging head.

While I have shown the attachment of square configuration, it is understood that it may be pentagonal, hexagonal or of any other angular outline.

In the claim the term "carriage bolt" is therefore intended to have reference not only to the common type of bolt of this character shown in Figs. 1, 4 and 7, but to any type of bolt which has substantially the same characteristics, is used for the same purpose and performs substantially the same function.

I claim:

The combination of a carriage bolt having the usual means for preventing rotation thereof and a nut-shaped body having an aperture to fit over said means in interlocking relation thereto and adapted to assume structurally and functionally the position of the head of a machine bolt.

In testimony whereof, I affix my signature.

DOUGLAS GRAND CARTER.